US011074823B2

(12) United States Patent
Pinchon

(10) Patent No.: US 11,074,823 B2
(45) Date of Patent: Jul. 27, 2021

(54) SYSTEM FOR AIDING THE LANDING OF AN AIRCRAFT IN A LANDING RUNWAY APPROACH PHASE

(71) Applicant: Airbus Operations S.A.S., Toulouse (FR)

(72) Inventor: Thibault Pinchon, Toulouse (FR)

(73) Assignee: Airbus Operations S.A.S.

(*) Notice: Subject to any disclaimer, the term of this patent is extended or adjusted under 35 U.S.C. 154(b) by 195 days.

(21) Appl. No.: 16/157,264

(22) Filed: Oct. 11, 2018

(65) Prior Publication Data
US 2019/0130772 A1    May 2, 2019

(30) Foreign Application Priority Data
Oct. 30, 2017    (FR) ...................... 17 60251

(51) Int. Cl.
| G08G 5/02 | (2006.01) |
| B64F 1/18 | (2006.01) |
| B64D 45/04 | (2006.01) |
| G08G 5/04 | (2006.01) |
| G08G 5/00 | (2006.01) |
| G01S 13/91 | (2006.01) |
| G01S 13/935 | (2020.01) |

(52) U.S. Cl.
CPC ............ *G08G 5/025* (2013.01); *B64D 45/04* (2013.01); *B64F 1/18* (2013.01); *G01S 13/913* (2013.01); *G01S 13/935* (2020.01); *G08G 5/0021* (2013.01); *G08G 5/0086* (2013.01); *G08G 5/045* (2013.01)

(58) Field of Classification Search
CPC ..... B64D 45/04; G01S 13/913; G01S 13/935; G08G 5/0086; G08G 5/025
See application file for complete search history.

(56) References Cited

U.S. PATENT DOCUMENTS

| 5,608,392 A | 3/1997 | Faivre et al. |
| 5,798,712 A | 8/1998 | Coquin |
| 6,980,892 B1* | 12/2005 | Chen .................... G01C 21/005 340/970 |
| 8,170,727 B2 | 5/2012 | Deker |
| 2002/0089433 A1 | 7/2002 | Bateman et al. |

(Continued)

FOREIGN PATENT DOCUMENTS

| EP | 0 674 300 A1 | 9/1995 |
| EP | 0 717 330 A1 | 6/1996 |

(Continued)

*Primary Examiner* — Anshul Sood
(74) *Attorney, Agent, or Firm* — Lerner, David, Littenberg, Krumholz & Mentlik, LLP

(57) ABSTRACT

A system for aiding landing includes a module for computing by extrapolation a trajectory of the aircraft on the basis of its current position, a module for determining whether the extrapolated trajectory cuts the ground ahead of a threshold of the landing runway, a module for measuring a current height of the aircraft above an overflown terrain, a module for determining whether the current height corresponds to a risk height, an alert module for generating an alert only if the two determinations carried out by the two determination modules are positive, and if the aircraft is situated at a distance with respect to the threshold of the landing runway which is less than a predetermined threshold distance.

12 Claims, 2 Drawing Sheets

(56) References Cited

U.S. PATENT DOCUMENTS

| | | | |
|---|---|---|---|
| 2004/0093131 A1 | 5/2004 | Block et al. | |
| 2007/0265776 A1* | 11/2007 | Meunier | G08G 5/045 |
| | | | 701/301 |
| 2010/0274486 A1* | 10/2010 | Lorido | G08G 5/0086 |
| | | | 701/301 |
| 2012/0095625 A1* | 4/2012 | Ishihara | B64C 25/00 |
| | | | 701/16 |
| 2015/0266590 A1* | 9/2015 | Henderson | G08G 5/045 |
| | | | 701/7 |
| 2017/0301247 A1* | 10/2017 | Sherry | G08G 5/0021 |
| 2018/0156633 A1* | 6/2018 | Fadden | B64D 43/02 |

FOREIGN PATENT DOCUMENTS

| | | |
|---|---|---|
| FR | 2 915 610 A1 | 10/2008 |
| FR | 3 044 298 A1 | 6/2017 |

* cited by examiner

SYSTEM FOR AIDING THE LANDING OF AN AIRCRAFT IN A LANDING RUNWAY APPROACH PHASE

FIELD OF THE INVENTION

The present invention relates to the field of aeronautics and more particularly to aiding the landing of an aircraft in a landing runway approach phase. The invention sits within the more general framework of the prevention of ground collision accidents in piloted flight.

BACKGROUND OF THE INVENTION

This type of accident is known in the technical literature by the acronym CFIT ("Controlled Flight Into Terrain").

Whilst in the past they constituted a significant proportion of air catastrophes, accidents of CFIT type have since been avoided for the most part, by virtue of terrain avoidance manoeuvres performed by crews under the prompting of alerts and alarms originating from on-board systems for automatically signalling the risks of collision with the terrain, known by the expression TAWS ("Terrain Awareness and Warning Systems") system, of which the EGPWS ("Enhanced Ground Proximity Warning System") system and the GCAS ("Ground Collision Avoidance System") system form part.

Generally, these systems compare the current position of the aircraft with an on-board database, modelling a protection volume which is dependent on the terrain overflown. The crew is warned in case of risk of collision with the ground so that the pilots can modify the trajectory of the aircraft.

During an approach ahead of a landing, the aircraft is situated in proximity to the terrain overflown. Thus, to avoid any alert which is incompatible with such an approach phase, TAWS systems are desensitized right from the start of the approach by a hardening of the conditions of activation of the alerts, and are then totally disabled during the final approach; that is to say no further alert is then emitted.

Improvements to TAWS systems have been proposed in order to prolong protection as close as possible to the landing runway.

For example, document FR 3044298 describes a method for aiding landing. This method proposes the combining of two complementary conditions in order to avoid an abnormal drop of an aircraft in the case of an accident of CFIT type. The first condition makes it possible to evaluate the risk of collision with the ground in relation to an ability of the aircraft to carry out a risk-free avoidance manoeuvre through a go-around. The second condition makes it possible to evaluate the risk of collision with the ground in relation to an absence of convergence of the trajectory of the aircraft with the runway threshold. Simultaneously combining the two conditions makes it possible at one and the same time to reduce inopportune alerts in the approach phase and to continue the monitoring of the aircraft throughout the approach phase, including the final approach up to the runway threshold.

However, this method is not completely satisfactory. Indeed, in particular in certain situations, it permits the emission of inopportune alerts which induce the pilot to perform unnecessary go-around manoeuvres.

BRIEF SUMMARY OF THE INVENTION

Aspects of the present invention may alleviate these drawbacks by proposing a method and a system for aiding landing making it possible to reduce the emission of inopportune alerts.

The invention relates to a method for aiding the landing of an aircraft in a landing runway approach phase.

The method comprises the following steps:
a computation step, implemented by a computational module, consisting in computing by extrapolation a trajectory of the aircraft on the basis of a current position of the aircraft,
a first determination step, implemented by a first determination module, consisting in determining whether the extrapolated trajectory of the aircraft cuts the ground ahead of a threshold of the landing runway.

According to an aspect of the invention, the method comprises the following steps:
a measurement step, implemented by a measuring module, consisting in measuring a current height of the aircraft above an overflown terrain,
a second determination step, implemented by a second determination module, consisting in determining whether the current height corresponds to a height considered to be a risk height,
an alert step, implemented by an alert module (8), consisting in generating an alert intended for a crew of the aircraft only if the following two conditions are simultaneously fulfilled:
the two determinations of the two determination steps are positive, and
the aircraft is situated at a distance with respect to the threshold of the landing runway which is less than a predetermined threshold distance.

Thus, by virtue of the invention, the number of inopportune alerts, that might in particular possibly cause unnecessary go-around manoeuvres, is appreciably decreased.

Furthermore, the extrapolated trajectory computed in the computation step is extrapolated on the basis of the current position, of the current speed and of the current acceleration of the aircraft.

Moreover, the first determination step consists in determining:
whether the extrapolated trajectory of the aircraft passes under a predetermined altitude vertically in line with the threshold of the landing runway, or
whether the extrapolated trajectory of the aircraft passes, at the altitude of the threshold of the landing runway, ahead of an auxiliary position upstream of the position of the runway threshold along a longitudinal axis of the runway.

According to one embodiment, the predetermined altitude corresponds to the altitude of the runway threshold, the auxiliary position corresponding to the position of the runway threshold along the longitudinal axis.

According to a variant, the predetermined altitude corresponds to the altitude of the runway threshold to within a margin, the auxiliary position corresponding to the position of the runway threshold along the longitudinal axis to within a margin.

Moreover, the second determination step consists in comparing the current height of the aircraft with a predetermined threshold height, the current height being considered to be a risk height if the said current height is less than the predetermined threshold height.

Advantageously, the predetermined threshold height is dependent on the horizontal distance between the aircraft and the landing runway.

For example, the threshold height is equal to the difference between, on the one hand, a first height corresponding to a nominal height included in a nominal approach trajectory at a current distance of the aircraft with respect to the threshold of the landing runway and, on the other hand, a second height corresponding to a height included in a predetermined surface vertically in line with the current position of the aircraft.

Furthermore, the predetermined surface corresponds to a surface establishing height limits around the landing runway.

According to a variant, the predetermined surface corresponds to a surface establishing height limits around the landing runway to within a margin.

In a nonlimiting manner, the predetermined threshold distance is substantially equal to 3 NM.

The invention also relates to a system for aiding the landing of an aircraft in a landing runway approach phase.

The system comprises:
a computational module configured to compute by extrapolation a trajectory of the aircraft on the basis of a current position of the aircraft,
a first determination module configured to determine whether the extrapolated trajectory of the aircraft cuts the ground ahead of a threshold of the landing runway.

According to an embodiment of the invention, the system comprises:
a measuring module configured to measure a current height of the aircraft above an overflown terrain,
a second determination module configured to determine whether the current height corresponds to a height considered to be a risk height,
an alert module configured to generate an alert intended for a crew of the aircraft only if the following two conditions are fulfilled:
the two determinations carried out by the two determination modules are positive, and
the aircraft is situated at a distance with respect to the threshold of the landing runway which is less than a predetermined threshold distance.

According to a particularity, the first determination module is configured to determine:
whether the extrapolated trajectory of the aircraft passes under a predetermined altitude vertically in line with the threshold of the landing runway, or
whether the extrapolated trajectory of the aircraft passes, at the altitude of the threshold of the landing runway, ahead of an auxiliary position upstream of the position of the runway threshold along a longitudinal axis of the runway.

According to another particularity, the second determination module is configured to compare the current height of the aircraft with a threshold height, the current height being considered to be risky if the said current height is less than a predetermined threshold height.

The invention relates furthermore to an aircraft comprising a system for aiding the landing of an aircraft in a landing runway approach phase, such as that specified hereinabove.

BRIEF DESCRIPTION OF THE DRAWINGS

The invention, with its characteristics and advantages, will emerge more clearly on reading the description given with reference to the appended drawings in which.

DETAILED DESCRIPTION

Figure 1:
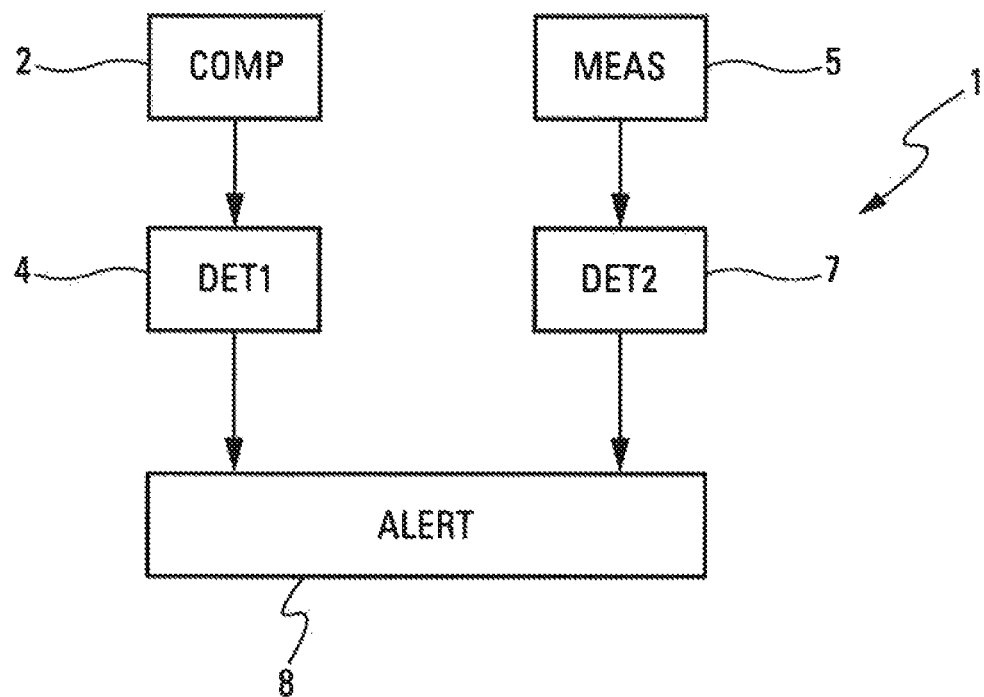
FIG. 1 represents a schematic diagram of the system for aiding landing.

FIG. 1 represents an embodiment of a system for aiding the landing 1 of an aircraft AC in an airport landing runway T approach phase. In the subsequent description, the system for aiding the landing 1 of an aircraft AC in a landing runway T approach phase is called system for aiding landing 1.

The system for aiding landing 1, on board the aircraft AC, comprises modules 2, 4, 5, 7, 8 making it possible to evaluate two conditions which must be simultaneously fulfilled in order to emit an alarm. The first condition is based on the evaluation of two risks of collision with the ground. If the two risks are both substantiated, the first condition is fulfilled. A second condition is based on the evaluation of the distance 11 of the aircraft AC with respect to the threshold S of the landing runway T. If the distance 11 with respect to the threshold S of the landing runway T is less than a threshold distance, the second condition is fulfilled.

Figure 3:
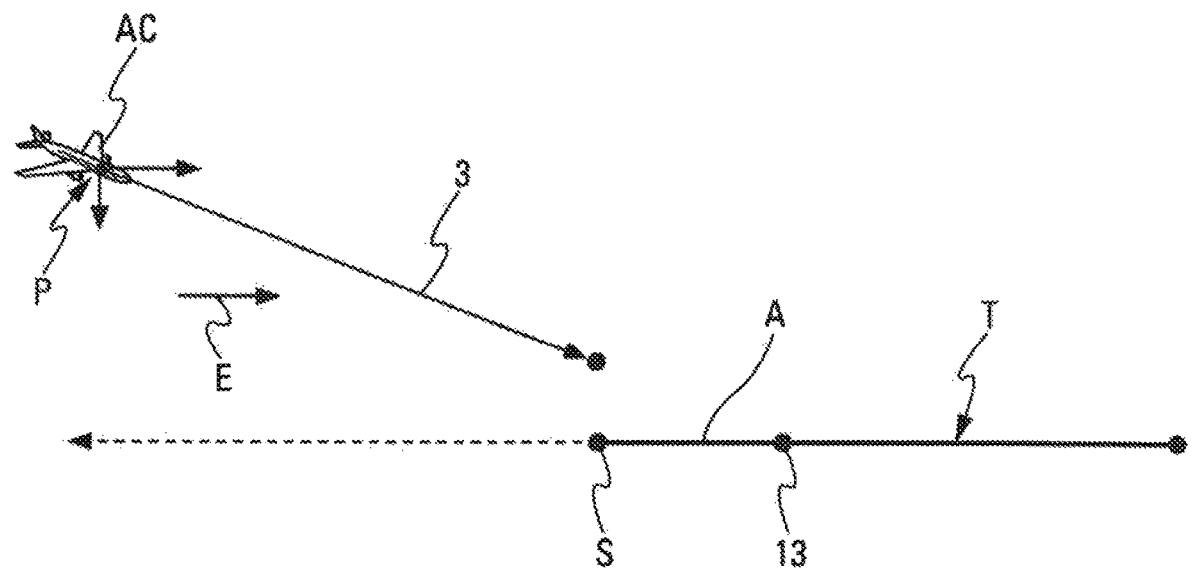
FIG. 3 represents an extrapolated trajectory for the evaluation of a first risk of collision with the ground during an aircraft approach phase.
Figure 4:
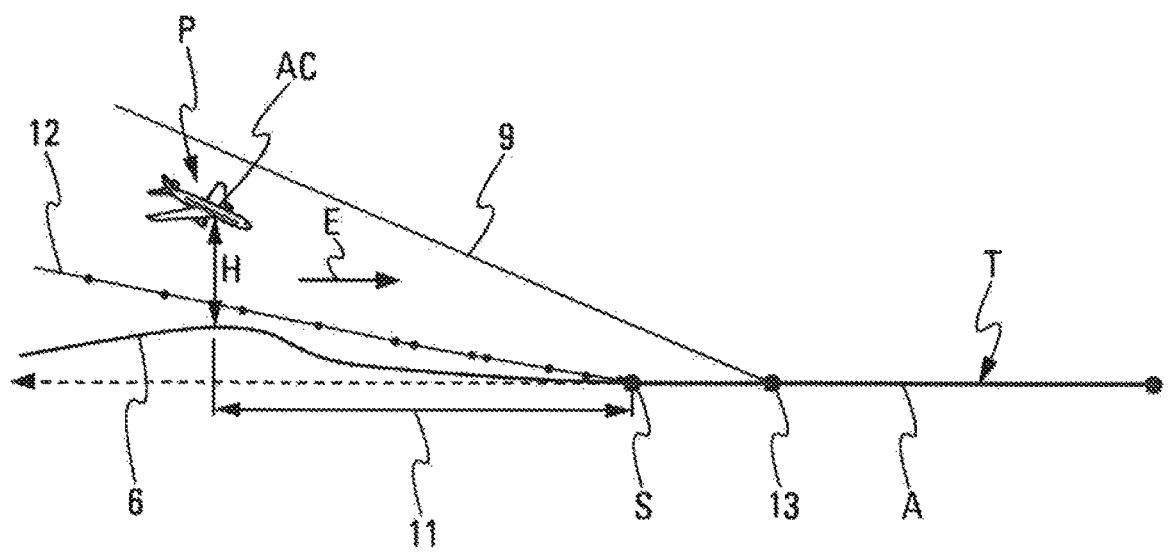
FIG. 4 represents a nominal approach trajectory and a surface establishing height limits around the landing runway for the evaluation of a second risk of collision with the ground during an aircraft approach phase.

The system for aiding landing 1 comprises a computational module COMP (COMP for "computational module") 2 configured to compute by extrapolation a trajectory 3 of the aircraft AC on the basis of a current position P of the aircraft AC and a determination module DET1 (DET for "determination module") 4 configured to determine whether the extrapolated trajectory 3 of the aircraft AC cuts the ground ahead of a threshold S of the landing runway T. (FIG. 3)

The computation by extrapolation of the trajectory 3 of the aircraft AC by the computational module 2 can correspond to the determination of a short-term projection (for example over 10 seconds to 20 seconds) of the current trajectory of the aircraft AC. Next, the determination module 4 determines whether this trajectory projection cuts the ground ahead of the threshold S of the landing runway T.

This trajectory 3 is termed short-term since it assumes that no piloting action will be engaged, this not being valid in the longer-term above all during an approach phase where piloting adjustments are generally performed. It is therefore a "normal" trajectory of the aircraft AC having regard to its current configuration, with no avoidance manoeuvre.

Any trajectory estimator or predictor meeting this need can be used. Preferably, the latter can be implemented in the form of code instructions in an on-board computer.

The short-term trajectory 3 estimation relies preferentially on the current position P, speed and acceleration of the aircraft AC, which are available via geopositioning devices such as a GPS (for "Global Positioning System") device and/or an inertial platform, such as an IRS (for "Inertial Reference System") device and/or a barometric device. These parameters delivered by these devices can be used raw or filtered (over several instants) so as to reduce the instability of the result, due to measurement noise (in particular in respect of the acceleration).

As a function of the time t, the current position $P(t)=(X(t), Y(t), Z(t))$, the speed $V(t)$ and the acceleration $A(t)$ of the aircraft can be determined in real time with the aid of on-board avionic sensors or of flight instruments.

The landing runway T comprises a threshold S of runway S $(X_S, Y_S, Z_S)$ and is oriented along a longitudinal axis A generally expressed with an angle with respect to geographical North.

To simplify the explanations, reference is made, hereinafter, to the motion of the aircraft AC in the vertical plane passing through the longitudinal axis A of the runway P. Indeed, the approach phase, at least final, of the aircraft AC is traditionally performed in this plane, since the aircraft AC is aligned with the longitudinal axis A of the runway P.

It will therefore be possible to define the runway P threshold S as origin of the Runway reference frame considered. Thus, X(t) (X>0 ahead of the threshold; X<0 after the threshold, in the direction E of motion of the aircraft AC) is the horizontal position of the aircraft AC (or ground distance of the aircraft AC from the runway T threshold S) and Z(t) is the altitude or height of the aircraft AC as a function of time t. In this reference frame, the aircraft AC approach phase takes place in the quadrant {X>0 and Z>0}.

Three-dimensional considerations do not modify the teachings of the invention, only require more complex trajectory computations, within the scope of the person skilled in the art.

The short-term trajectory 3 estimation is aimed at evaluating for example the height of the aircraft on passing (therefore when vertically in line with) the runway T threshold S, that is to say evaluating Z(t) when X(t)=0.

The short-term trajectory 3 of an aircraft AC can be extrapolated with the aid of a finite expansion. The order of the finite expansion has an impact on the precision and the stability of the forecast. In one embodiment, a finite expansion of order 2 is used as follows, knowing that the current instant is $t_0$:

$$Z(t) = z(t_0) + t \times V_Z(t_0) + \frac{t^2}{2} \times A_Z(t_0)$$

where $V_Z(t_0)$ and $A_Z(t_0)$ are the vertical components of the speed (negative when descending) and of the acceleration (generally positive since deceleration along the decreasing altitude axis Z) of the aircraft AC at the instant $t_0$.

$$\text{Likewise, } X(t) = X(t_0) + t \times V_X(t_0) + \frac{t^2}{2} \times A_X(t_0).$$

Such a finite expansion exhibits the advantage of being simple, and therefore easily used by on-board computers.

The determination module 4 makes it possible to evaluate a first risk of collision with the ground by determining whether the extrapolated trajectory 3 of the aircraft AC cuts the ground ahead of the threshold S of the landing runway T.

The determination performed by the determination module 4 is positive if the extrapolated trajectory 3 of the aircraft AC cuts the ground ahead of the threshold S of the landing runway T.

This determination can be carried out:
  either by determining whether the extrapolated trajectory 3 of the aircraft AC passes under a predetermined altitude $Z_{risk}$ vertically in line with the threshold S of the landing runway T, that is to say, if at an instant $t_{thresh}$ at which the aircraft AC passes vertically in line with the threshold S $X(t_{thresh})=0$, we have $Z(t_{thresh})<Z_{risk}$;
  or by determining whether the extrapolated trajectory 3 of the aircraft AC passes, at the altitude (Z=0) of the threshold S of the landing runway T, ahead of an auxiliary position $X_{risk}$ upstream of the position of the runway threshold $X_S$ of the runway threshold along a longitudinal axis A of the landing runway T, that is to say whether at an instant $t_{thresh}$ at which the aircraft AC passes by the altitude of the threshold $Z(t_{thresh})=0$, we have $X(t_{thresh})>X_{risk}$. In particular, the predetermined altitude or the auxiliary position corresponds to the altitude of the runway T threshold S (that is to say $Z_{risk}=0$) or the position of the runway T threshold S along the longitudinal axis A (that is to say $X_{risk}=0$), respectively. As a variant, margins (positive and/or negative) can be taken in order to adjust the sensitivity of the system. These margins are representative of a safety height of the aircraft AC above the runway threshold.

This first risk represents the risk that the aircraft AC touches the ground ahead of the runway T threshold S.

Returning to the example of the finite expansion of order 2 hereinabove:

$$Z(t) = z(t_0) + t \times V_Z(t_0) + \frac{t^2}{2} \times A_Z(t_0),$$

and $$X(t) = X(t_0) + t \times V_X(t_0) + \frac{t^2}{2} \times A_X(t_0),$$

it is assumed that the horizontal acceleration is negligible and we denote by $t_{thresh}$ the instant at which the aircraft crosses the runway T threshold S, $X(t_{thresh})=0$.
We therefore have $t_{thresh} = -V_X(t_0)/X(t_0)$.

$$\text{Thus, } Z(t_{thresh}) = Z(t_0) + \frac{V_X(t_0)}{X(t_0) \times V_Z(t_0)} + \frac{1}{2}\left(\frac{V_X(t_0)}{X(t_0)}\right)^2 \times A_Z(t_0).$$

The value $Z(t_{thresh})$ can therefore be computed by the determination module 4.

The system for aiding landing 1 furthermore comprises a measuring module MEAS (MEAS for "measuring module") 5 configured to measure a current height H of the aircraft AC above an overflown terrain 6 and a determination module DET2 7 configured to determine whether the current height H corresponds to a height considered to be a risk height.

The measuring module 5 can comprise a radioaltimeter on board the aircraft AC for measuring the current height H of the aircraft AC above the ground 6.

The determination module 7 makes it possible to evaluate a second risk of collision with the ground by determining whether the current height H of the aircraft AC is a risk height.

The determination performed by the determination module 7 is positive if the current height H of the aircraft AC corresponds to a height considered to be a risk height.

Thus, the determination module 7 can determine whether the current height H of the aircraft AC is a risk height by comparing the said current height H with a predetermined threshold height.

The current height H is considered to be a risk height if the said current height H is less than the predetermined threshold height.

Preferentially, the predetermined threshold height is dependent on the horizontal distance between the aircraft AC and the landing runway T.

According to one embodiment, the threshold height is equal to the difference between, on the one hand, a first height corresponding to a nominal height included in a nominal approach trajectory 9 at a current distance 11 of the aircraft AC with respect to the threshold S of the landing runway T and, on the other hand, a second height corresponding to a height included in a predetermined surface 12 vertically in line with the current position P of the aircraft AC.

The nominal approach trajectory 9 corresponds, for example, to a trajectory exhibiting a 5% slope or an angle of 3 degrees with respect to the longitudinal axis A of the landing runway T and forecasting landing runway T touchdown 13 at 300 metres after the runway T threshold S.

The predetermined surface 12 can correspond to a surface establishing height limits around the landing runway T. For example, this surface 12 corresponds to the obstacle limitation surface or OLS (for "Obstacle limitation surface") surface of the final section. An OLS surface defines the limit up to which objects (obstacles and terrain) can project into the airspace. The OLS surface is defined by the International Civil Aviation Organization or ICAO for landing runways of given categories. For example, for category 3 and 4 runways, the trajectories based on these OLS surfaces exhibit slopes of 2%. As a variant, margins (positive and/or negative) can be taken with respect to the surface 12 establishing height limits around the landing runway T.

Once the two determination modules 4 and 7 have evaluated the risks, an alert may or may not be emitted as a function of the evaluation of the said risks.

The system for aiding landing 1 therefore also comprises an alert module ALERT (ALERT for "alert module") 8 configured to generate an alert intended for a crew of the aircraft AC only if two conditions are fulfilled.

A first condition consists in knowing whether the two determinations carried out by the two determination modules 4 and 7 are positive, that is to say whether the two risks are substantiated.

The second condition consists in knowing whether the aircraft AC is situated at a distance 11 with respect to the threshold S of the landing runway T which is less than a predetermined threshold distance.

In a nonlimiting manner, the predetermined threshold distance is substantially equal to 3 NM (about 5556 m).

The alert module 8 thus makes it possible to generate an alert intended for the crew only if the two risks are substantiated and if the aircraft AC is situated at a distance 11 with respect to the threshold S of the landing runway T which is less than the predetermined threshold distance.

This generation can consist in producing an alert message or in allowing through an alert message originating from on-board systems for automatically signalling the risks of collision with the ground. In the latter case, the system for aiding landing 1 officiates as filter of the messages originating from the on-board systems, so as to delete inopportune messages which are not appropriate to the current situation.

Dedicated alerts specific to the combination of evaluated risks can be proposed. In both cases, it is also possible to employ the already existing alerts of the TAWS system. In a combination of these two possibilities, provision may be made for dedicated and specific alerts as a supplement to those of the TAWS system, by modifying the disabling of the TAWS system so as to profit from the existing alerts during the final approach phase.

Two kinds of alert can be provided for:
on the one hand, a visual alert. In this case, a link is used between a computer which can host the modules 2, 4, 5, 7, 8 of the system for aiding landing 1 and a generator of a visual message on a main flight screen (PFD for "Primary Flight Display"), a dedicated lamp, etc. situated on the flight deck of the aircraft AC; and
on the other hand, a sound or verbal alert. In this case, a link is used between the computer which can host the modules 2, 4, 5, 7, 8 of the system for aiding landing 1 and an audio message generator situated on the flight deck of the aircraft AC.

Likewise, several levels of alert can be provided for, relying for example on various margins defining various predetermined altitudes $Z_{risk}$ and/or auxiliary positions $X_{risk}$ used to evaluate the first risk.

For example, two alert levels can be proposed:
one serving as first warning for the crew. At this juncture, the risk of collision with the ground is not imminent since the margins used are significant, thereby making it possible to trigger the preventive alert several seconds before the risk becomes imminent. The procedure associated with this alert consists in correcting the trajectory (generally bringing it closer to the nominal trajectory 9) so as to revert to a risk-free situation. However, if no trajectory correction is engaged by the pilot, the risk will increase so as to toggle to the second alert level;
the other serving as warning of an imminent risk. This alert relies on the algorithms described above with margins which are tiny but sufficient to avoid collision if an action, generally an avoidance manoeuvre (interruption of the approach and go-around at maximum throttle), is taken immediately by the pilot.

According to one embodiment, the modules 2, 4, 5, 7, 8 are integrated into a central unit or a computer.

By way of example, the modules 2, 4, 5, 7, 8 of the system for aiding landing 1 correspond to algorithms implemented in a software manner in the central unit. In particular, the modules 2, 4, 5, 7, 8 can be stored in at least one memory area of the central unit.

The system for aiding landing 1 implements a method for aiding the landing of an aircraft AC in a landing runway T approach phase.

Figure 2:
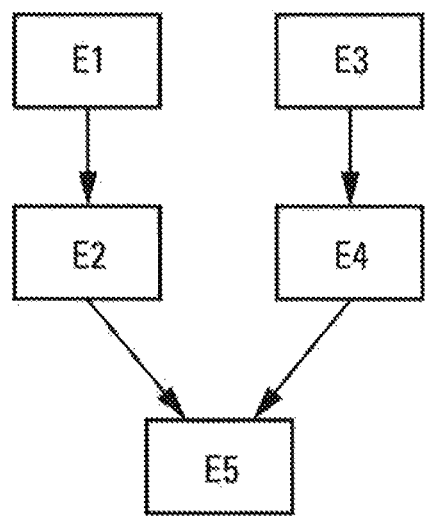
FIG. 2 represents a schematic diagram of the method for aiding landing.

The method (FIG. 2) comprises the following steps:
a step E1 of computation, implemented by the computational module 2, consisting in computing by extrapolation a trajectory 3 of the aircraft AC on the basis of a current position P of the aircraft AC,
a step E2 of determination, implemented by the determination module 4, consisting in determining whether the extrapolated trajectory 3 of the aircraft AC cuts the ground ahead of a threshold S of the landing runway T.
a step E3 of measurement, implemented by the measuring module 5, consisting in measuring a current height H of the aircraft AC above an overflown terrain 6,
a step E4 of determination, implemented by the determination module 7, consisting in determining whether the current height H corresponds to a height considered to be a risk height,
a step E5 of alert, implemented by the alert module 8, consisting in generating an alert intended for a crew of the aircraft AC only if the following two conditions are fulfilled:
the two determinations of the two determination steps E2 and E4 are positive, and
the aircraft AC is situated at a distance with respect to the threshold S of the landing runway T which is less than a predetermined threshold distance.

Step E2 of determination can consist in determining:

whether the extrapolated trajectory 3 of the aircraft AC passes under a predetermined altitude vertically in line with the threshold S of the landing runway T, or whether the extrapolated trajectory 3 of the aircraft AC passes, at the altitude of the threshold S of the landing runway T, ahead of an auxiliary position upstream of the position of the runway T threshold S along a longitudinal axis A of the runway T.

Step E4 of determination can consist in comparing the current height H of the aircraft AC with a predetermined threshold height. The current height H is considered to be a risk height if the said current height H is less than a predetermined threshold height.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for aiding the landing of an aircraft in a landing runway approach phase, comprising:
   a step of computation, implemented by a computational module, including computing by extrapolation a trajectory of the aircraft on the basis of a current position of the aircraft;
   a first step of determination, implemented by a first determination module, including determining whether the extrapolated trajectory of the aircraft cuts the ground ahead of a threshold of the landing runway;
   a step of measurement, implemented by a measuring module, including measuring a current height of the aircraft above an overflown terrain;
   a second step of determination, implemented by a second determination module, including determining whether the current height corresponds to a height considered to be a risk height; and
   a step of alerting, implemented by an alert module, including generating an alert intended for a crew of the aircraft only if the following two conditions are simultaneously fulfilled:
      the two determinations of the two determination steps are positive, and
      the aircraft is situated at a distance with respect to the threshold of the landing runway which is less than a predetermined threshold distance,
      wherein the second determination step includes comparing the current height of the aircraft with a predetermined threshold height, the current height being considered to be the risk height if the said current height is less than the predetermined threshold height, and
      wherein the threshold height is equal to the difference between a first height corresponding to a nominal height included in a nominal approach trajectory at a current distance of the aircraft with respect to the threshold of the landing runway and a second height corresponding to a height included in a predetermined surface vertically in line with the current position of the aircraft, wherein the nominal approach trajectory corresponds to a trajectory exhibiting a predetermined slope or a predetermined angle with respect to a longitudinal axis of the landing runway and forecasting a landing runway touchdown at a predetermined distance after the threshold of the landing runway.

2. The method according to claim 1, wherein the extrapolated trajectory computed in the computation step is extrapolated on the basis of the current position, of a current speed and of a current acceleration of the aircraft.

3. The method according to claim 1, wherein the first determination step includes determining:
   whether the extrapolated trajectory of the aircraft passes under a predetermined altitude vertically in line with the threshold of the landing runway, or
   whether the extrapolated trajectory of the aircraft passes, at the altitude of the threshold of the landing runway, ahead of an auxiliary position corresponding to the position of the runway threshold along a longitudinal axis of the runway.

4. The method according to claim 3, wherein the predetermined altitude corresponds to the altitude of the runway threshold.

5. The method according to claim 3, wherein the predetermined altitude corresponds to the altitude of the runway threshold to within a margin, the auxiliary position corresponding to the position of the runway threshold along the longitudinal axis to within a margin.

6. The method according to claim 1, wherein the predetermined threshold height is dependent on the horizontal distance between the aircraft and the landing runway.

7. The method according to claim 1, wherein the predetermined surface corresponds to a surface establishing height limits around the landing runway.

8. The method according to claim 1, wherein the predetermined surface corresponds to a surface establishing height limits around the landing runway to within a margin.

9. The method according to claim 1, wherein the predetermined threshold distance is substantially equal to 3 NM.

10. A system for aiding the landing of an aircraft in a landing runway approach phase, comprising:
   a computational module configured to compute by extrapolation a trajectory of the aircraft on the basis of a current position of the aircraft;
   a first determination module configured to determine whether the extrapolated trajectory of the aircraft cuts the ground ahead of a threshold of the landing runway;
   a measuring module configured to measure a current height of the aircraft above an overflown terrain;
   a second determination module configured to determine whether the current height corresponds to a height considered to be a risk height;
   an alert module configured to generate an alert intended for a crew of the aircraft only if the following two conditions are fulfilled:
      the two determinations carried out by the two determination modules are positive, and
      the aircraft is situated at a distance with respect to the threshold of the landing runway which is less than a predetermined threshold distance,
      wherein the second determination module is further configured to compare the current height of the aircraft with a predetermined threshold height, the current height being considered to be the risk height if the said current height is less than the predetermined threshold height, and wherein the threshold height is equal to the difference between a first height corresponding to a nominal height included in a nominal approach trajectory at a current distance of the aircraft with respect to the threshold of the landing runway and a second height corresponding to a height included in a predetermined surface vertically in line with the current position of the aircraft, wherein the nominal approach trajectory corresponds to a trajectory exhibiting a predetermined slope or a predetermined angle with respect to a longitudinal axis of the landing runway and forecasting a landing runway touchdown at a predetermined distance after the threshold of the landing runway.

11. The system according to claim 10, wherein the first determination module is configured to determine:

whether the extrapolated trajectory of the aircraft passes under a predetermined altitude vertically in line with the threshold of the landing runway, or whether the extrapolated trajectory of the aircraft passes, at the altitude of the threshold of the landing runway, ahead of an auxiliary position upstream of the position of the runway threshold along a longitudinal axis of the runway.

12. An aircraft, comprising a system for aiding the landing of the aircraft in a landing runway approach phase, according to claim 10.

* * * * *